United States Patent
Marotta et al.

[15] 3,652,294

[45] Mar. 28, 1972

[54] MANUFACTURE OF STARCH-CONTAINING FOOD PRODUCTS

[72] Inventors: Nicholas G. Marotta, Green Brook; Gary A. Zwiercan, North Plainfield; Richard M. Boettger, Morristown, all of N.J.

[73] Assignee: National Starch and Chemical Corporation, New York, N.Y.

[22] Filed: Aug. 19, 1970

[21] Appl. No.: 65,279

Related U.S. Application Data

[63] Continuation-in-part of Ser. No. 678,498, Oct. 27, 1967, abandoned.

[52] U.S. Cl. ...........................................99/83, 99/1, 99/81, 99/100 P
[51] Int. Cl. ........................A23l 1/18, A23l 1/10, A23l 1/12
[58] Field of Search...................99/1, 80, 81, 83, 93, 100 P

[56] References Cited

UNITED STATES PATENTS

| | | |
|---|---|---|
| 2,863,770 | 12/1958 | Speiser ...........................................99/1 |
| 3,027,258 | 3/1962 | Markakis et al. .............................99/81 |
| 3,407,070 | 10/1968 | Murray et al. ................................99/83 |
| 3,150,978 | 9/1965 | Campfield .....................................99/1 |
| 3,259,503 | 7/1966 | Tan et al. ......................................99/83 |
| 3,282,701 | 11/1966 | Wong et al. ...................................99/1 |
| 3,506,454 | 4/1970 | Reesman .......................................99/81 |

*Primary Examiner*—Raymond N. Jones
*Assistant Examiner*—James R. Hoffman
*Attorney*—Thomas B. Graham

[57] ABSTRACT

Ready-to-eat food products and a method for their preparation which comprises moistening a pregelatinized starch product, shaping the resulting blend, and thereafter putting the food product into edible form by means of a suitable baking operation.

6 Claims, No Drawings

MANUFACTURE OF STARCH-CONTAINING FOOD PRODUCTS

RELATED APPLICATION:

This application is a continuation-in-part of our application Serial No. 6798,498 filed Oct. 27, 1967, now abandoned, and assigned to the assignee of the subject application.

BACKGROUND OF THE INVENTION

It is highly desirable that so-called "ready-to-eat" snack food products possess certain properties of texture, taste, appearance and ease of manufacture. Thus, for example, such products should preferably, be produced by means of a process which permits their rapid solidification or setting, thereby enabling them to retain the shape in which they are initially prepared. They should have sufficient rigidity to permit their being sliced or cut. Upon being put into edible form, such products should be crisp and should retain their crispiness over prolonged periods. They should not be unpleasingly tough and, of course, they should have an appealing flavor. Color variations in these products should be reduced to a minimum, while their shelf life should be the maximum which is attainable.

Present recipes and means of production provide few, if any, special measures which are designed to insure the attainment of the above described properties of appearance, texture and taste. Thus, for the most part, such prior art products neither set rapidly nor retain their desired shapes and, in addition, have proved difficult to handle and cut. Furthermore, the taste of such prior art, ready-to-eat, snack food products has fluctuated as a result of the inherent variations present in the various natural base ingredients which have been used in their manufacture.

In addition, such prior art snack food products have ordinarily been prepared by means of a multi-step procedure which requires initial cooking of the blended ingredients, frequently at elevated pressures; extended drying of the cooked products; and, thereafter deep frying in order to put the product into its final edible form. Each of the latter required steps has served to present the practitioner with any number of problems relating to their successful completion such, for example, as the problems inherent in the use of elevated pressures; the time consuming nature of the drying step; and, the absorption of oil by the food product during the deep frying operation and the resulting adverse effect on the taste and appearance characteristics of the resulting food product.

SUMMARY OF THE INVENTION:

It is, thus, the prime object of this invention to prepare starch-containing, ready-to-eat food products which are highly and uniformly expanded in volume and exhibit outstanding characteristics of taste, texture and appearance. It is a further object to provide a convenient and efficient method for the preparation of such food products. Various other objects and advantages of this invention will become apparent from the following description thereof.

We have now found that all of the previously described advantages are obtained when the food products are made by a process which embodies the following essential factors:

a. The major component of the mixture must be a pregelatinized root or root-like starch. By "major component" we mean more than 50 percent by weight of the total food product. The terms "root or root-like" starch are well known in the art, root starches referring to starch such as tapioca starch, and "root-like" starches are those which, while not actually derived from roots or tubers, nevertheless exhibit many of the properties of conventional root starches. Typical examples of root-like starches are waxy maize and waxy milo starch.

b. The aforementioned pregelatinized starch must be characterized by its ability to swell in water to the extent that one gram of the starch, when mixed in water at a temperature of 25° C., will absorb at least about 10 grams of water.

c. The pregelatinized starch is moistened with from 18 percent to 30 percent of water, by weight of the starch; is then pressed into the desired shape without the need for application of heat or pressure (beyond the obvious pressure required to shape the material), and the thus-shaped pieces are then oven-baked without any predrying of the shaped pieces prior to baking, and without any frying in fat or oil.

d. Since it is essential that the shaped pieces undergo a substantial increase in volume upon oven baking, and that the texture of the baked product be tender and crisp, rather than tough, there must be nothing admixed with the starch that will tend to cause such toughening or loss of volume. Specifically, the pregelatinized starch must not contain more than 5 percent by weight, of vital gluten.

Prior art process for making so-called snack foods involved in most cases the prior manufacture of a "half-product", this normally being sliced very thin (less than one-eighth of an inch, in practice), dried to a moisture level below 15 percent the "half-product" being subsequently fried in deep fat. Amounts of water substantially greater than 30 percent were used, in practice, in order to form the dough for making the "half-product" and predrying before frying was an essential and costly step. Some degree of puffing was sometimes encountered, but the prior art methods dealt mainly with the making of thin, crisp, potato-chip types. Our process differs in that it does not involve the making of a "half-product" and requires no predrying to a specified moisture level, but rather may be extruded or otherwise shaped and immediately thereafter baked. Our products may be shaped in to substantially thicker portions that was heretofore the practice, and must be oven-baked, rather than deep-fat fried, in order to achieve the uniform expansion in volume and the desired tender texture.

As examples of the wide variety of specialty food products which may be prepared by means of the novel process of this invention, one may list crackers, chips, cereal puffs, and other so-called "snack" items; the latter products being available in a multiplicity of flavors and shapes. These products may also be ground and thereafter used as coatings for fried and/or baked food products.

DETAILED DESCRIPTION OF THE INVENTION:

The starches which must be used in the novel process of this invention comprise pregelatinized starches derived only from either root or root-like starch bases. As examples of such starch bases, tapioca starch may be viewed as a typical root starch, while waxy maize and waxy milo are typical root-like starches. The "root-like" starches are well known to those skilled in the starch technology art and are generally defined as starches which, although not being derived from roots or tubers, nevertheless exhibit a substantial number of the characteristics and properties possessed by conventional root starches. Thus, for example, cooked pastes prepared from root-like starches, like those prepared from tapioca and other root starches, are clear, fluid, cohesive and relatively non-gelling in nature; properties which are in direct contrast to those exhibited by cereal-type starch pastes.

Also included are the pregelatinized conversion products derived from any of the latter starch bases including, for example, dextrines from any of the latter starch bases including, for example, dextrines prepared by the hydrolytic action of acids and/or heat; oxidized starches prepared by treatment with oxidants such as sodium hypochlorite; and, fluidity or thin boiling starches prepared by enzyme conversion or by mild acid hydrolysis. In addition, the selected pregelatinized starch base may have been chemically derivatized, as by means of an esterification reaction which would thus yield esters such, for example, as the acetate, propionate and butyrate esters; or, by means of an etherification reaction which would thus yield ethers such, for example, as the hydroxyethyl, hydroxypropyl and carboxymethyl ether derivatives. It should also be noted that pregelatinized flours and meals derived from any of the above described starch bases are also applicable for use in the novel process of this invention, provided always that the pregelatinized starch in the composition represents more than 50 percent of the total weight of the composition.

Additionally, any of the above starch base sources may also be inhibited, i.e. crosslinked, by means of a reaction with a cross-linking agent containing at least two functional groups which can react with at least two available hydroxy groups of the starch molecule or molecules; the latter crosslinking agents including, for example: epichlorohydrin, phosphorous oxychloride, cyanuric chloride, metaphosphates, polymetaphosphates, aldehydes, succinic anhydride, and mixtures of adipic and citric acids with acetic anhydride. The amount of crosslinking which should be present in the latter crosslinked starches is determined by the granule swelling power (GSP) thereof. Thus, granule swelling power is a measure of the extent of granule inhibition, and may be defined as the amount of swollen, hydrated paste which is formed by the cooking, in water under specific conditions, of one gram of dry starch as divided by the weight of anhydrous starch in the swollen paste.

The GSP is usually determined, in practice, by dispersing one gram of starch (anhydrous weight) in enough distilled water to give a total weight of 100 grams. Normally, the starch is suspended in this water, stirred over a boiling water bath for five minutes, and then covered for the remainder of the cooking cycle. After cooking is complete, the sample is readjusted to a weight of 100 grams and transferred, quantitatively, into graduated 100 milliliter centrifuge cups. The sample is then centrifuged at 2,000 revolutions per minute for exactly 20 minutes and the starch dispersion is removed as a clear supernate and a compacted swollen paste. The percent solids in the supernate is determined by evaporation of an aliquot. The wet weight of the swollen paste is determined directly after decantation of the supernate and the amount of dry solids in the paste is determined by evaporation. The granule swelling power is then calculated by the formula:

$$GSP = \frac{\text{Wet weight of swollen paste}}{\text{Weight of dry starch in swollen paste}}$$

In order to function effectively in the novel process of this invention and to provide food products exhibiting optimum properties, the applicable inhibited starches should have a GSP value which is greater than about 14. Therefore, the quantity of crosslinking reagent to be used in the inhibition procedure may be defined as that amount required to obtain a product having a GSP value of greater than about 14. Excessive inhibition, which lowers the GSP value appreciably below 14 results in starch products which are incapable of providing puffy, uniform, light textured food products.

It should be noted that relatively minor amounts of cereal starches and flours, whether gelatinized or ungelatinized, can be utilized in conjunction with the above defined pregelatinized starch products. None of these cereal materials, however, can be employed in the absence of a major quantity of a pregelatinized root or root-like starch, as taught by the novel process of this invention, since the predominant use of such cereal products results in the preparation of food products which are difficult to shape and handle, which exhibit gummy and fragile textures, and which lack the desired puffiness and crispiness when baked. It is especially important that the composition contain no more than 5 percent by weight of vital gluten (whether as an extraneous component or as a part of added cereal flour), since larger amounts have been found to inhibit the desired puffing upon baking and result in undesirable texture.

As previously noted, it is required that the starch components of the novel food products of this invention be pregelatinized, i.e., they should swell in water which is at a temperature of 25° C. to the extent that one gram of the starch will absorb at least about 10 grams of water. This determination may be conducted by dispersing one gram of the gelatinized starch in 100 milliliters of water which is contained in a standard 100 milliliter graduated cylinder which is at a temperature of 25° C. and thereafter noting the volume displaced by the sediment which is formed. A sediment volume of at least 10 milliliters qualifies the gelatinized starch product as one suitable for use in the novel process of this invention.

The method ordinarily used for producing such pregelatinized starches involves the swelling of the starch granules. For purposes of this invention, the gelatinization process preferably used is drum drying. In the latter procedure, an aqueous slurry of the starch is passed over heated rollers which raise the temperature of the slurry above the gelatinization point of the starch present therein while also evaporating the water therefrom, so as to ultimately yield dry, solid particles of pregelatinized starch.

The drum drying conditions, e.g., temperature and drum speed, under which the starch is gelatinized and dried will, of course, vary according to the particular starch and the degree and density of the granule swelling which is desired. In addition, it should be noted that the above described procedure may be varied by pre-cooking the starch, as by the use of a boiling water bath, a swept-surface heat exchanger, or a jet cooker apparatus, prior to the drum drying operation. The use of any of the latter procedures thus enables the practitioner to utilize lower drum temperatures and rotating speeds as well as to reduce the overall time required for the drum drying operation. In all case, however, the pregelatinized starch products resulting from the drum drying process are in the form of thin, solid sheets which may then be pulverized prior to being utilized in preparing the novel products of this invention.

Other mechanical means of accomplishing the latter gelatinization step, e.g. spray drying, flash drying and extrusion, etc., may also be utilized if so desired by the practitioner. It should be noted, however, that the drum drying procedure is most economical and efficient for purposes of this invention.

The amount of moisture which is admixed with the pregelatinized starch product should be sufficient to partially hydrate the starch particles so as to enable them to be shaped into the desired configuration while also permitting them to retain the latter shape during the subsequent handling and cooking operations. In determining the applicable concentration of water which is to be introduced, the practitioner should take into account the specific starch being used, the nature and proportions of any optional ingredients which may be either initially present or subsequently added, the particular characteristics which are desired in the ultimate food product and the equipment which is to be used in its preparation. Thus, concentrations of water ranging from 18 percent to 30 percent, and preferably no more than about 25 percent, as based on the total weight of the composition, are operable in the process of this invention. It should be noted that the moisture which may be inherently present in the various components of the composition is not included in determining the concentration of water that is to be added.

Thus, the preparation of the novel food products of this invention may be accomplished merely by thoroughly mixing the selected pregelatinized starch product with water, together with any optional ingredients whose presence may be desired, and thereafter shaping the moist blend into any desired configuration; the latter steps all usually being conducted at ambient temperatures, without the need for high pressure devices. A conventional shaping device may be utilized for the shaping operation including such, for example, as an extruder or a roller. In utilizing an extruder, the moist material is introduced into the cold extruder and sufficient pressure is applied to force the mass through an orifice or die which gives the product its final shape. A wide variety of orifice shapes may be used including, for example, straight or serrated slits, round or oval openings, fluted circular shapes and tubed openings, etc. It is also possible to extrude the product in the form of a ribbon or thin sheet so that the desired shape of the individual pieces of the ultimate food product may be cut from the resulting ribbons and sheets. The raw product which thus results is a shape-retaining mass which has sufficient rigidity to be sliced and further handled.

Of great interest if the fact that the shaped product need not be subjected to time consuming setting and drying operations which were characteristic of the prior art process but is, rather, immediately available for the subsequent and final step in its preparation. Needless to say, these intermediate, i.e. uncooked, products may be stored for prolonged periods before being put into edible form without experiencing any adverse effects.

Ultimately, the shaped products are subjected to baking in an oven, resulting in a puffing or substantial expansion in their volume together with a marked reduction in their moisture content to a degree that the resulting puffed products are not gummy or tough in consistency but are rather, substantially dry and exceedingly crispy. Thus, these products are converted into fluffy, crisp, light-textured, tasty, uniform, ready-to-eat food products. The baking operation may be conducted in any suitable oven of either the conventional or microwave type. Thus, the conventional baking operation is typically conducted at temperatures ranging from about 300° to 500° F. for a period of about 3 to 15 minutes, while the conditions under which the microwave baking is conducted should be empirically determined in order to obtain the most favorable results. Experience has shown that oven baking, rather than other means of cooking, as for example deep fat frying, is essential in order to obtain the uniform puffing and the other desired properties in the final products.

As previously noted, the novel food products of this invention may, if desired, contain a wide variety of additives which serve to flavor, color and/or stabilize the resulting products. Among such optional additives are included: flavoring materials such as dried cheeses, potato granules and flakes, peanut butter, dried meats, bacon, cocoa, dried fruits, nuts, pizza flavor, onion, garlic, mustard, sodium chloride, monosodium glutamate, sweeteners, pepper and paprika; coloring agents such as carotene; stabilizers and thickeners such as methyl cellulose and sodium caseinate, preservatives such as calcium propionate; plasticizers; anti-oxidants; emulsifiers; and the like. It is to be noted that these additives are present in our novel food products in only a minor concentration. Such additives are generally added to the pregelatinized starch product either before or after it is moistened. However, where an extruder is utilized for the shaping operation, such additives may, if desired, be injected into the mass as it passes through the extruder barrel or die.

It is to be noted that the unique food products of this invention can only be adequately described by making reference to the process which has been utilized for their preparation.

The following examples will further illustrate the embodiment of our invention. In these examples, all parts given are by weight unless otherwise noted. In all cases, the starch products described in the following examples had been gelatinized to the extent that one gram of each of the respective starches could absorb at least about 10 grams of water, as determined by means of the above described sediment volume procedure.

EXAMPLE I

This example illustrates the preparation of a typical ready-to-eat food product resulting from the novel process of this invention.

Thus, 775 parts of a tapioca starch which had been pregelatinized by being subjected to a drum drying procedure for a period of 10–12 seconds at a drum temperature of 300° to 350° F. were thoroughly admixed with 225 parts of water. The resulting mix was pumped into an extruder which was maintained at room temperature and forced, by means of a three-fourths quarter inch conveying screw, into a shaping die. The solid, rope-like product which emerged from the die exhibited excellent shape-retention properties and could be sliced immediately after the shaping procedure.

The cut slices where then inserted, for a period of 10 minutes, in a conventional oven which was maintained at a temperature of 350° F. The resulting baked products exhibited a desirable puffed appearance and were found to be exceedingly crisp and light textured.

When the above example was repeated, except that the cut slices were fried in deep fat, the resulting products were unsatisfactory because of the absence of uniform puffing. Such puffing as did occur, resulted in a large hollow "bubble" in the center of the fried mass, the remainder being quite dense and unpuffed.

EXAMPLE II

This example illustrates the variety of starch products which can be effectively utilized in preparing ready-to-eat food products by means of the novel process of this invention. It further illustrates the poor results which are obtained when starches which were not previously designated for use in the process of this invention are, nevertheless, utilized therein.

Thus, a variety of food products were prepared according to the procedure set forth in EXAMPLE I, hereinabove; each of the latter products corresponding to the following recipe:

|  | parts |
|---|---|
| pregelatinized starch product | 600 |
| spray dried cheddar cheese | 200 |
| water | 200 |

The cheese which was included in these recipes was preblended with the starch prior to the moisturizing and shaping operations.

In order to quantitatively demonstrate the properties of the resulting baked food products, the latter products were subjected to the following test procedures:

Specific Volume - This procedure was intended to measure the expanded, puffy appearance which should be exhibited by superior ready-to-eat food products. Thus, specific volume was determined by first measuring the volume of poppy seed displaced when a baked sample of known weight was placed into a known volume of poppy seed and thereafter inserting the resulting data into the following equation:

$$\text{Specific volume} = \frac{\text{Volume of displaced poppy seed (cubic centimeters)}}{\text{Weight of baked sample (grams)}}$$

Subjective Rating - In this procedure, the texture, taste, color and uniformity of the baked food products were evaluated on a scale ranging from 1-10 wherein the higher ratings were assigned to products which excelled in each of the latter properties.

The starches utilized in each of the recipes as well as the characteristics of the finished food products, as determined by the above-specified test procedures, are presented in the following table. It should be noted that the specified starches were drum dried by means of the procedure referred to in the description of the starch product utilized in Example I.

|  | *Specific (c.c.) Volume(g.) | Subjective Rating |
|---|---|---|
| A drum dried tapioca starch | 3.7 | 7 |
| a drum dried waxy maize starch | 4.12 | 6 |
| a drum dried, modified waxy milo starch | 4.8 | 8½ |
| a drum dried waxy maize starch which had been acetylated and inhibited to a GSP value of 22.2 with 5%, by weight, of an adipic-acetic mixed anhydride containing 1 part of adipic acid and 40 parts of acetic anhydride | 6.27 | 9 |
| a drum dried waxy maize starch which had been inhibited to a GSP value of 24.3 with 0.035%, by weight, of epichlorohydrin | 5.5 | 8½ |
| a drum dried waxy maize starch which had been inhibited to a GSP value of 20.1 with 0.07%, by weight, of epichlorohydrin | 4.6 | 8½ |
| a drum dried waxy maize starch which had been inhibited to a GSP value of 21.2 with 0.07%, by weight, of epichlorohydrin and acetylated with 1%, by weight, of acetic anhydride | 4.2 | 7 |
| a drum dried waxy maize starch which had been acetylated with 1%, by weight, of acetic anhydride | 4.2 | 6 |
| a drum dried waxy maize starch which had been inhibited to a GSP value of 22.7 with 0.05%, by weight, of epichlorohydrin and acetylated with 2%, by weight, of acetic anhydride | 4.5 | 6½ |
| a drum dried waxy maize starch which | 3.7 | 6 |

| | | |
|---|---|---|
| had been inhibited with 0.3%, by weight, of sodium tri-metaphosphate | | |
| a drum dried waxy maize starch which had been oxidized by treatment with 2%, by weight, of sodium hypochlorite | 4.6 | 7 |
| a drum dried hydroxypropylated waxy maize starch resulting from the treatment of a waxy maize starch with 5%, by weight, of propylene oxide which had been inhibited to a GSP value of 23.1 with 0.02%, by weight, of phosphorus oxychloride | 4.1 | 7½ |
| a drum dried waxy maize starch which had been converted with hydrochloric acid to a degree known as 50 fluidity | 3.5 | 5½ |
| a waxy maize starch (no pregelatinization) | 1.3 | 2 |
| a drum dried corn starch | 1.4 | 2 |
| a drum dried wheat starch | 1.4 | 2 |
| a drum dried rice starch | -- | 2 |
| a drum dried soy flour | 1.6 | 2 |
| a drum dried corn starch which had been inhibited with 0.15%, by weight, of epichlorohydrin | 1.4 | 2 |
| a drum dried corn starch which had been acetylated with 5%, by weight, of acetic anhydride | could not be extruded | 4 |
| a drum dried waxy maize starch which had been inhibited to a GSP value of 11.2 with 0.24%, by weight, of epichlorohydrin | 2.7 | 4 |

*The specific volume of each sample prior to baking was 1.3 cubic centimeters/gram.

The data summarized above thus clearly indicates the excellent taste, texture and appearance characteristics exhibited by the novel food products of this invention as well as the necessity for utilizing only the starch products previously designated in order to be able to obtain ready-to-eat food products which exhibit the latter optimum properties.

EXAMPLE III

This example illustrates the preparation of typical ready-to-eat food products of this invention wherein a variety of optional additives are also included.

A. Cheese Flavored Food Product

The procedure set forth in Example I, hereinabove, was utilized to prepare the following food recipe. In this instance, all dry materials were initially blended and then admixed with the water.

| | %, by weight |
|---|---|
| a waxy maize starch which had been inhibited to a GSP value of 22.2 and acetylated with 5 percent, by weight, of an adipic-acetic mixed anhydride containing 1 part of adipic acid and 40 parts of acetic anhydride and which had been pregelatinized by being subjected to a drum drying procedure for a period of 6-7-½ seconds at a drum temperature of 300 to 350° F. | 60.00 |
| spray dried cheddar cheese | 10.00 |
| parmesan cheese | 4.00 |
| spray dried blue cheese | 3.00 |
| salt | 2.00 |
| mustard powder | 0.10 |
| onion powder | 0.50 |
| monosodium glutamate | 0.10 |
| garlic powder | 0.03 |
| water | 20.27 |

The resulting food product exhibited an excellent expanded, uniform appearance. In addition, it was exceedingly tasty, crisp and light textured.

B. Potato Flavored Food Product

The following ingredients were utilized in preparing this particular food product:

| | %, by weight |
|---|---|
| a pregelatinized starch product (as described in A, hereinabove) | 50 |
| potato granules | 20 |
| vegetable oil | 10 |
| water | 20 |

Thus, the starch product and the potato granules were thoroughly blended whereupon the vegetable oil and the water were, respectively, admixed therewith. The resulting blend was then extruded at room temperature, as described in Example I, and baked in a conventional oven for a period of 10 minutes at a temperature of 350° F. The resulting potato product was exceedingly tasty, crisp and light textured.

C. Peanut Butter Flavored Food Product

The following ingredients were utilized in preparing this particular food product:

| | %, by weight |
|---|---|
| a pregelatinized starch product (as described in A, hereinabove) | 60 |
| peanut butter | 20 |
| water | 20 |

Thus, the water was thoroughly admixed with the starch-peanut butter blend. The resulting moisturized blend was then extruded at room temperature, as described in Example I, and baked in a conventional oven for a period of 10 minutes at a temperature of 350° F. The resulting food product had an excellent peanut butter taste and was exceedingly crisp and light textured.

D. Bacon Flavored Food Product

The following ingredients were utilized in preparing this particular food product:

| | %, by weight |
|---|---|
| a pregelatinized starch product (as described in A, hereinabove) | 60 |
| bacon bits | 13 |
| bacon dripping | 7 |
| water | 20 |

Initially, the bacon was fried, drained and then ground into fine pieces. Thereafter, the bacon bits were blended with the starch whereupon each of the liquid components were, respectively, admixed with the resulting blend. The moisturized blend was then extruded at room temperature, as described in Example I, and baked in a conventional oven for a period of 10 minutes at a temperature of 350° F. The resulting food product was exceedingly tasty, crisp and light textured.

E. Chocolate Flavored Food Product

The following ingredients were utilized in preparing this particular food product

| | %, by weight |
|---|---|
| a pregelatinized starch product (as described in A, hereinabove) | 60 |
| cocoa | 10 |
| softened chocolate | 10 |
| synthetic sweetener | 2 |
| water | 18 |

Thus, the solution of sweetener in water was thoroughly admixed with the blend of starch, cocoa and softened chocolate. The resulting blend was then extruded at room temperature, as described in Example I, and baked in a conventional oven for a period of 10 minutes at a temperature of 350° F. The resulting "cookie-like" products had an excellent chocolate taste and were exceedingly crisp and light textured.

When formulations "A", "B", "C" and "D" were repeated, except that 6 percent or more of vital gluten was incorporated into the mixture prior to baking, the baked product was unsatisfactory both with regard to the degree of puffing and especially with regard to texture, the products being substantially tougher and less crisp than those made without the vital gluten.

Summarizing, the novel process of this invention may thus be said to result in the preparation of starch-containing, ready-to-eat food products having vastly improved properties by means of a rapid, efficient procedure.

Variations may be made in proportions, procedures and materials without departing from the scope of this invention which is defined by the following claims.

What is claimed is:

1. A process for preparing a starch-containing, ready-to-eat food product which consisting essentially of the steps of: (1) mixing a dry, pregelatinized starch with from about 18 percent to 30 percent of water, based on the total weight of the moistened blend, said starch being selected from the group consisting of root starches, waxy maize and waxy milo starch; said starch being characterized by its ability to swell in water which is at a temperature of 25° C. to the extent that one gram of said starch will absorb at least about 10 grams of water; (2) thereafter compressing the moistened blend resulting from step (1) at ambient temperatures so that it achieves a self-sustaining shape; and pregelatinized starch in said shaped blend containing no more than 5 percent, by weight, of vital gluten; and (3) cooking said shaped blend by means of an oven baking process which simultaneously effects a substantial and uniform expansion in the volume thereof along with a marked decrease in the moisture content thereof, thereby obtaining an edible product which is characterized by its fluffiness, crispness and light texture.

2. The process of claim 1, wherein said shaping operation is conducted in an extruder which is operated at ambient temperatures.

3. The process of claim 1, wherein a minor amount of food flavor or color is mixed with said pregelatinized starch prior to the cooking step.

4. The process of claim 1, wherein a minor amount of a cereal starch or flour is mixed with said pregelatinized starch prior to the cooking step.

5. The process of claim 1, wherein the pregelatinized starch is a waxy maize starch which has been inhibited and acetylated with 5 percent, by weight, of an adipic-acetic mixed anhydride containing one part, by weight, of adipic acid and 40 parts, by weight, of acetic anhydride.

6. The starch-containing, ready-to-eat food product prepared by the process of claim 1.

* * * * *